US006235256B1

(12) United States Patent
Lang et al.

(10) Patent No.: US 6,235,256 B1
(45) Date of Patent: May 22, 2001

(54) PROCESS AND DEVICE FOR THE SCRUBBING ACIDIC GASES

(75) Inventors: Diethard Lang, Reutte; Alfred Glasner, Passail; Dieter Chybin; Georg Obwaller, both of Graz, all of (AT)

(73) Assignee: Austrian Energy & Environment SCP/Waagner-Biro GmbH (AT)

( * ) Notice: Subject to any disclaimer, the term of this patent is extended or adjusted under 35 U.S.C. 154(b) by 0 days.

(21) Appl. No.: 09/029,136

(22) PCT Filed: Sep. 5, 1996

(86) PCT No.: PCT/AT96/00156

§ 371 Date: May 11, 1998

§ 102(e) Date: May 11, 1998

(87) PCT Pub. No.: WO97/09111

PCT Pub. Date: Mar. 13, 1997

(30) Foreign Application Priority Data

Sep. 7, 1995 (AT) ........................................ 1483/95

(51) Int. Cl.[7] ........................................ C01B 17/00

(52) U.S. Cl. ........................ 423/220; 423/232; 423/242.1; 423/243.06; 422/168

(58) Field of Search ........................ 423/220, 232, 423/242.1, 243.06; 95/267, 272; 261/116, 117, DIG. 75; 422/168

(56) References Cited

U.S. PATENT DOCUMENTS 1,908,782 * 5/1933 Pearce .
4,312,646 * 1/1982 Fattinger et al. ...................... 55/218
4,374,813 * 2/1983 Chen et al. .......................... 423/242
4,469,493 * 9/1984 Tuovinen et al. ........................ 55/89
4,618,482 * 10/1986 Shinoda et al. ...................... 423/242
4,784,674 * 11/1988 Sarmiento et al. ...................... 55/96
4,828,768 5/1989 Talmor ................................ 261/116
5,181,944 1/1993 Jarvenpaa .............................. 55/235
5,565,180 * 10/1996 Spink .................................. 423/220
5,630,991 * 5/1997 Gal et al. ........................ 423/243.01

FOREIGN PATENT DOCUMENTS 2322982 11/1974 (DE) .
333588 11/1976 (DE) .
3031951 3/1981 (DE) .
3230352 2/1984 (DE) .
4015831 11/1991 (DE) .
4226726 2/1994 (DE) .
4331415 3/1995 (DE) .
0162536 11/1985 (EP) .
0682972 11/1995 (EP) .

* cited by examiner

*Primary Examiner*—Steven P. Griffin
*Assistant Examiner*—Marikel Medina
(74) *Attorney, Agent, or Firm*—Steinberg & Raskin, P.C.

(57) ABSTRACT

In a process and corresponding device for scrubbing acidic gases out of flue gases using adsorbent-containing suspensions, the flue gases are conveyed into a scrubber with narrowing channels and accelerated in a first stage in a direction opposite to the flow of suspension droplets and in a second stage in the same direction as the flow of liquid droplets, the suspension having already been broken down into droplets before or at the beginning of the acceleration section. Reflux of the suspension into the acceleration section is prevented by the shape of the channels. Flue gas and suspension droplets react and in the connecting first mist precipitator, the droplets are turned around 180° in the direction of gravitational forces.

16 Claims, 3 Drawing Sheets

H2O
17''
4
17'
10
29
10'
17'
3
2
3
18
11
12
18'
1
19
5
O2
17
6'
13
6
14
20
O2
15
Mg(OH)2
CaSO4. 2H2O
22
16
CaCl2+CaSO4. 2H2O 25
26
26
25
9'
9'
8
8
23
27
17
27

PROCESS AND DEVICE FOR THE SCRUBBING ACIDIC GASES

FIELD OF THE INVENTION

The invention relates to a process for scrubbing acidic gases, in particular $SO_2$, HCl and $H_2S$ from flue gas by means of alkaline or earth-alkaline suspensions, lime stone and/or dolomite, in which the flue gases are scrubbed in several stages with a suspension and/or solution broken down into droplets and a device to carry out the process. As seen in the direction of flue gas flow, the flue gas is first directed through a spraying or scrubbing tower in the first scrubbing stage in an opposite direction to the flow of liquid droplets being sprayed through nozzles and in a second scrubbing stage in the same direction as the spray of liquid droplets. In the second stage, the flue gas is directed through one or more narrowing channels having throats in a direction opposite to the force of gravity, i.e., vertically upward, into an acceleration segment of the channels defined between the inlet of the channels and the narrowest point of the throat. In this manner, the scrubbing liquid in the form of droplets before the acceleration segment formed by the throats, or at the beginning of same.

BACKGROUND OF THE INVENTION

DE 43 31 415 A1 discloses a process for the treatment of gases in two scrubbing steps, whereby the scrubbing liquid drops in both steps as an substantially evenly distributed rain and is separated from the gas stream.

From AT-PS 333 588, it is known to scrub $SO_2$ out of $SO_2$-containing flue gases by means of an earth alkali slurry in two stages and to reconstitute usable bisulfite, whereby great pressure loss occurs because of the multiple deflection of the flue gas. The energy expenditure for the transfer pumping of scrubbing fluid together with the absorption solution as well as for the spraying of the scrubbing fluid in the different scrubbers is considerable. This applies in particular if a product to be dumped is to be produced.

OBJECTS AND SUMMARY OF THE INVENTION

It is an object of the present invention to eliminate this disadvantage and to achieve inexpensive separation of acidic flue gas components by using the least expensive absorption means such as lime stone and/or dolomite, in particular following power station steam producers, whereby the used absorption solution can be dumped without any problems if necessary.

The process according to the invention is characterized in that the droplets are deflected by 180° in the direction of gravitational force in a first demister, i.e. a mist precipitator, after the step with a reaction zone lying between a throat and an inlet of a channel into the first demister, using preferably a ratio of <5 $lm^3$ in nearly parallel and concentric channels and are then conveyed to a second demister.

In additional embodiments of the process in accordance with the invention, the channel has a variable cross-section and an acceleration section is defined between an inlet of the channel and a narrowest cross-section of the channel (i.e., the throat), the liquid droplets being sprayed in a vertically upward direction into the channel and the flue gas being directed to flow vertically upward. The channel and the first demister are ideally constructed such that the velocity of the flue gas in the acceleration section of the channel is less than about 23 m/s, the velocity of the flue gas in the reaction zone between the channel and the first demister is less than about 18 m/s, and a ratio of the velocity of the flue gas in the reaction zone to the velocity of the flue gas in the acceleration section is about 0.7. The channel is formed between a pair of walls, the reaction zone being defined between the walls after the channel, and the pair of walls are formed such that the droplets are deflected away from the portion of the walls defining the reaction zone. The velocity of the flue gas may be increased in the first demister as the flue gas is turned around in the channels in the first demister. As the droplets in the second stage, a suspension containing lime stone or dolomite dust having a high residual carbon value may be used such that the residual carbon content in the second stage is greater than the residual carbon content in the first stage, the density of the lime stone or dolomite being greater than about 50 g/l. The suspension is removed after interacting with the flue gas from the spray tower and at least part of the sulfite of the removed suspension is oxidized into sulphate.

In other embodiments, the droplets are collected after interacting with the flue gas, i.e., after scrubbing the same, in a settling basin situated at a bottom of the spray tower, and sulfite in the suspension in the settling basin is oxidized by directing at least one of air and flue gas into the settling basin of the spray tower. After the droplets are collected, after interacting with the flue gas, the solution collected in the basin may be subjected to a scrubbing for magnesium hydroxide or heavy metal catalysts. Alternatively, the droplets may be collected after interacting with the flue gas in an oxidation tank, sulfites in the suspension in the oxidation tank oxidized by directing at least one of air and flue gas into the oxidation tank, and a level of suspension 11 in the oxidation tank maintained substantially equal to a level at which the spray nozzles associated with the second stage are situated.

The device according to the invention to carry out the process is characterized in that a wet scrubber with downstream two-level demister is provided, and in particular installed on the scrubbing tower, after a scrubbing tower for the atomization of a scrubbing fluid, whereby a carbon-containing suspension is used as the scrubbing liquid for the absorption of the acidic gas components, and in that the device is provided with parallel and concentric channels for the deflection of the droplets by 180° in the direction of the gravitational force and in that a suspension container in form of an oxidation tank is provided next to the scrubbing tower, its liquid surface being provided approximately at the level of the spray nozzles of the wet scrubber and in that the wet scrubber is provided with throats for the acceleration of the flue gases in a direction contrary to the direction of gravitational force, with constriction of the gas flow from 0–50%, preferably 20% and in that the spray nozzles of the wet scrubbers are located under the throats, whereby the spray nozzles of the wet scrubber and the device for atomization of the scrubbing liquid are installed in the scrubbing tower in such manner that the liquid droplets in the wet scrubber are introduced in the direction of gas flow and in the direction opposite to gas flow in the scrubbing tower and in that the throats are made in form of pocket-shaped catch grooves with a tear edge.

In additional embodiments of the arrangement in accordance with the invention, the channels in the scrubber are pocket-shaped and comprises a tear edge. Guide plates may be arranged to define the channels in the first demister, an uppermost one of the guide plates including a V-shaped central groove with an opening angle of greater than about 90° such that the guide plates form an angle a with a horizontal plane in the reaction zone that is less than about 45°. A settling basin may be arranged at a bottom of the scrubbing tower for receiving droplets after interacting with the flue gas, an outlet coupled to the settling basin for removing the suspension from the settling basin, and a dewatering device is coupled to the outlet for receiving the removed suspension.

A basic embodiment of the invention relates to a spray tower including means for directing flue gases containing acidic gases, such as $SO_2$, HCl and $H_2S$, in a flow path, and means for spraying liquid droplets of alkaline or earth-alkaline absorbents, lime stone and/or dolomite into the flow path of the flue gases to react with the acidic gases and thereby scrub the flue gases. The improvement is a demister arranged at a location after the liquid droplets have been sprayed by the spray means into the flow path of the flue gases and which includes parallel and concentric channels arranged to turn the flue gases by about 180°. The spray means comprise a first set of nozzles arranged to spray liquid droplets in a direction opposite to the direction of flow of the flue gases, and a second set of nozzles arranged after first set of nozzles in the flow path of the flue gases and to spray liquid droplets in the same direction as the flow direction of the flue gases. $(NH_4)_2SO_4$ may be introduced into the second stage and $Ca(OH)_2$ may be added to the droplets after interacting with the flue gas, thereafter ammonium may be removed by stripping the same from the droplets. The resultant solution may then be recycled into the second stage. At least one channel is arranged between the second set of nozzles and the demister and through which the flue gases flow, the nozzles in the second set of nozzles being arranged to spray the droplets from a location below the channel(s) into the respective channel in an upward direction while the flue gases flow in the upward direction. Each channel has a variable cross-section and an acceleration section is defined between an inlet thereof and a narrowest cross-section (throat) thereof. Each channel is formed by a first pair of walls arranged between a second pair of walls, each wall in the first pair of walls has an inwardly directed tear edge so that the throat may be defined between the tear edges. Also, each channel narrows from an inlet to a throat such that the flue gases are accelerated when passing therethrough.

BRIEF DESCRIPTION OF THE DRAWINGS

The invention is described schematically in examples in the attached FIGS. 1 to 3.

DETAILED DESCRIPTION OF THE INVENTION

Figure 1:
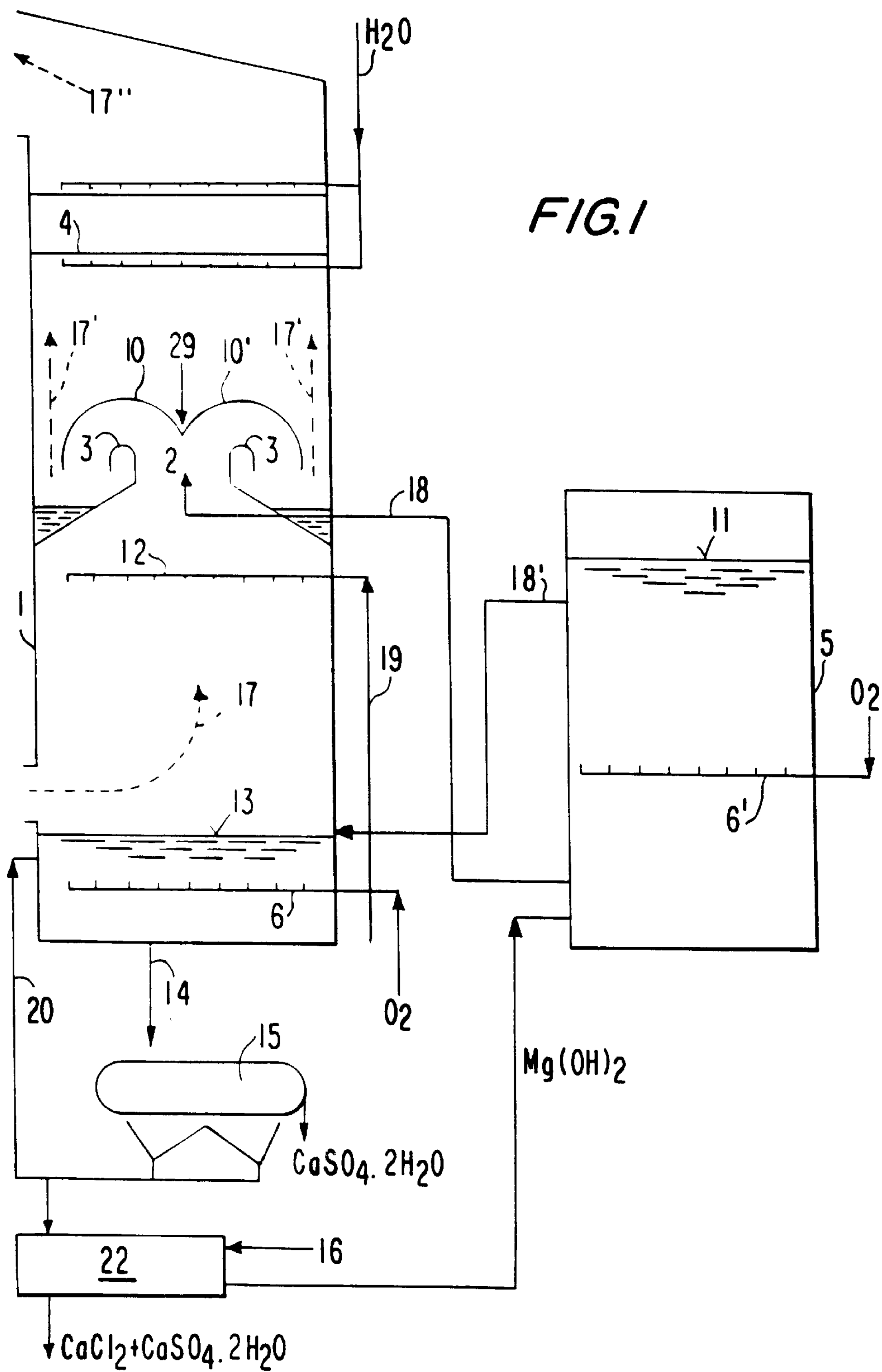
FIG. 1 shows a diagram of the device according to the invention.

Referring to the accompanying drawings wherein like reference numerals refer to the same or similar elements, in FIG. 1, a wet scrubber 2 is arranged in a scrubbing tower 1 and is followed by a demister having a first stage or step 3 and a second stage 4. This part of the design is traversed from bottom to top by a flue gas flow 17, 17', 17" containing acidic flue gas components, whereby the acidic flue gas components such as $SO_2$, HCl and $H_2S$ are removed from it. This is achieved since lime stone or a lime-stone containing substance such as dolomite is slurried in the form of dust in a suspension container 5 and the suspension thus produced is carried through a channel or conduit 18 to be sprayed or atomized through spray nozzles 23 of the scrubber 2. In the suspension container 5, there is an oxidation stage 6' in which an oxygen-containing gas is blown into connection with the slurry in the suspension container 5 for the oxidation of the sulfite produced during scrubbing into sulfate. Furthermore, a channel 18' extends from the suspension container 5 into a settling basin 13 at the bottom of the scrubbing tower 1 so that the settling basin 13 is also supplied with a carbonate suspension which is sprayed in via circulation channel 19 in the scrubbing tower 1 in a spray plane defined by a first set of nozzles 12. The flue gas stream 17 is scrubbed in a direction counter to the falling drops and good scrubbing capacity of approximately 50% is achieved for a single-stage scrubbing tower 1. In this sense, the scrubbing solution in the scrubbing tower 1 across from the wet scrubber 2 may contain a small amount of residual carbonate. Thanks to the second stage, the scrubbing efficiency can be raised to over 99%.

Figure 2:
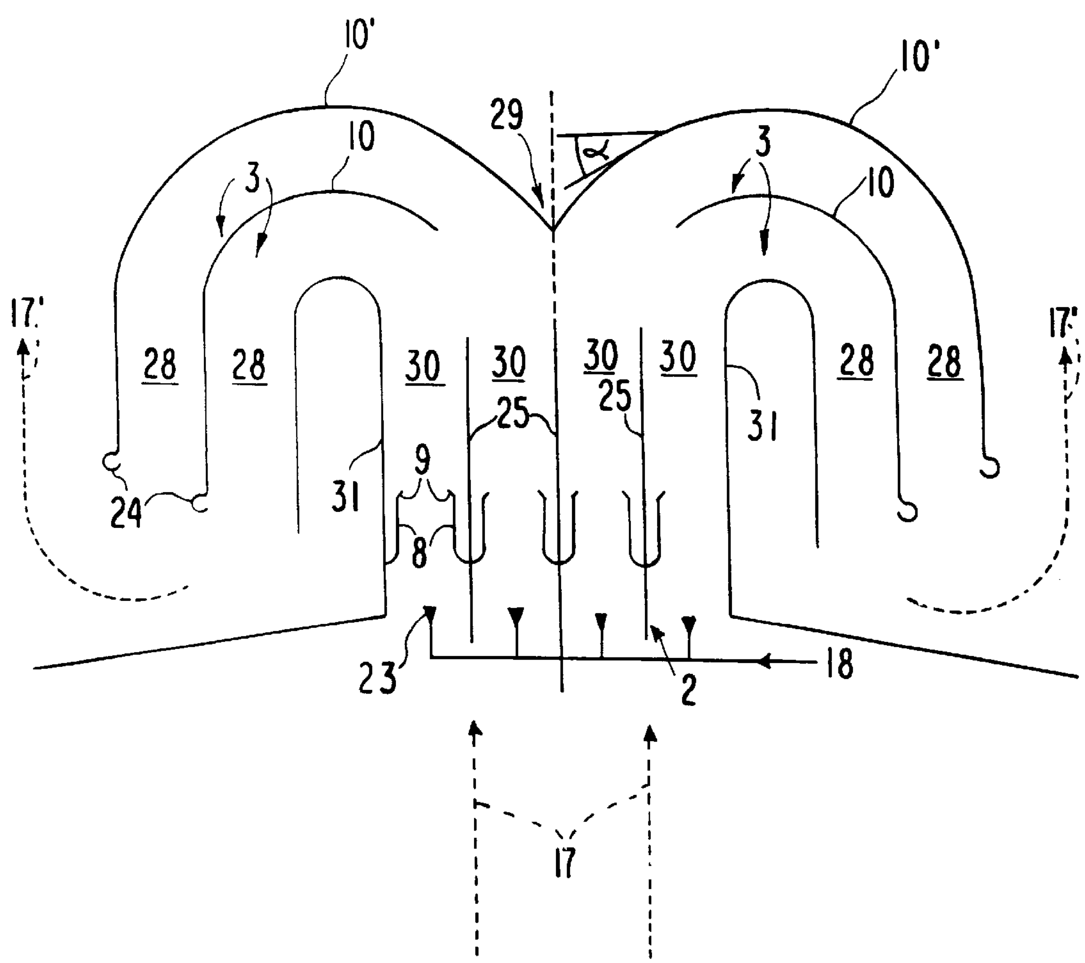
FIG. 2 shows in simplified representation a constructive embodiment of the wet scrubber and of the first demister in detail.

The scrubber 2 in FIG. 2 has at least one and preferably a plurality of narrowing channels 8, with the upper end of the channel 8 being formed by a tear edge 9 which further narrows the cross-section of the channel, which may the diameter of the channel if the channel is circular. The channel 8 which is also called an acceleration section has a slight constriction from 0% to 50%, preferably 20% of the flow cross-section, so that a flow velocity of less than about 23 m/s which is further reduced to less than about 18 m/s in the reaction zone is achieved. The reaction zone is defined between the walls 25 after the channel 8 and before the first stage demister 3. The ratio of flue gas velocity in the acceleration section to the flue gas velocity in the reaction zone should be approximately 0.7.

Figure 3:
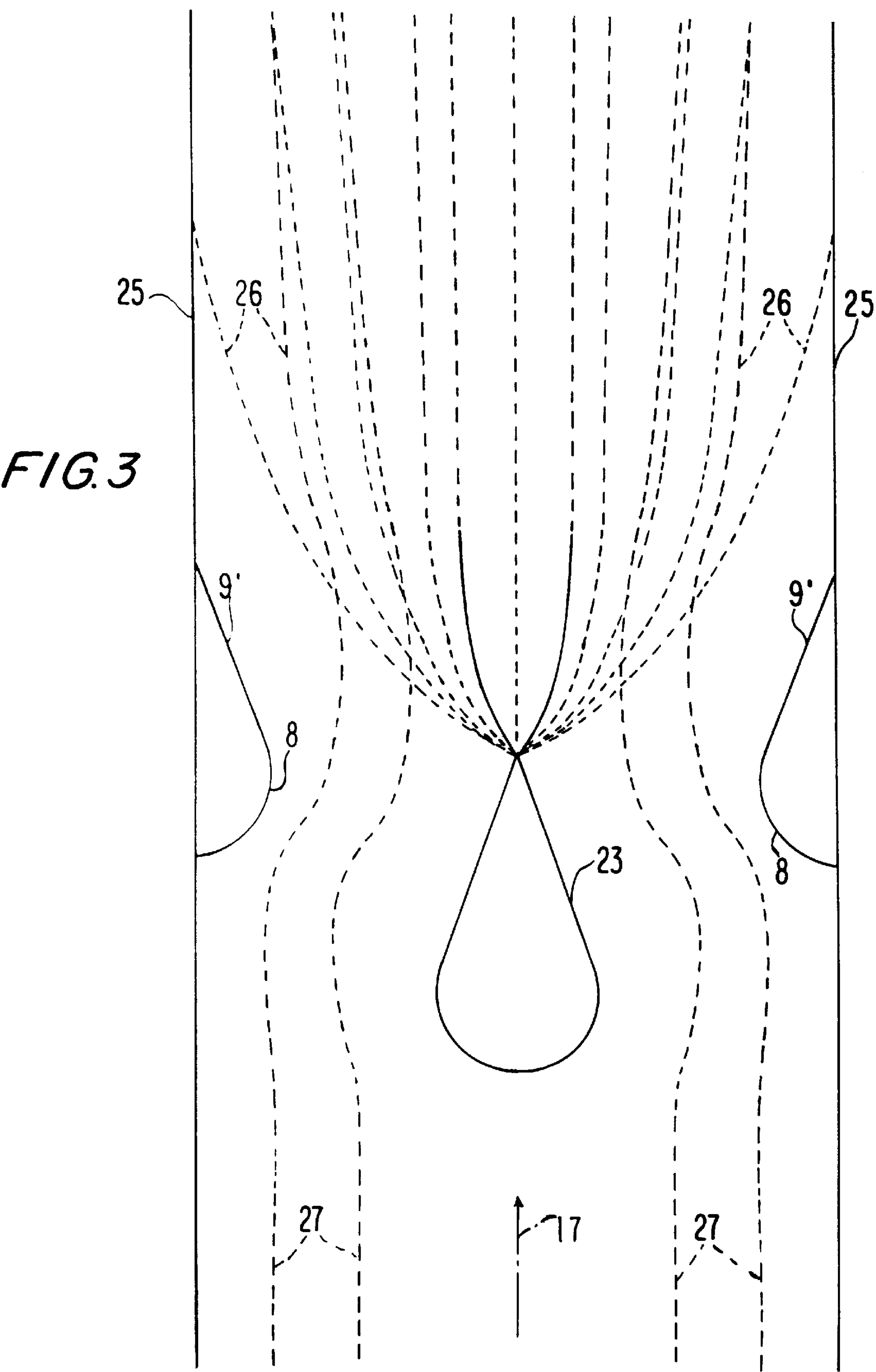
FIG. 3 shows in simplified representation a second constructive embodiment of the wet scrubber in detail.

FIG. 3 shows the constriction of a channel 8 in detail, or shows part of the channel 8 of the wet scrubber 2, whereby the gas flow 17 is represented by the flow lines 27. This gas flow is accelerated by the constriction and the downstream diffusor 9' to such extent that the liquid flowing from the nozzle 23 has as little contact as possible with the following wall 25 and the production of wall water remains low. The desired paths for the droplets are designated with reference 26. The flue gas velocity in the channel 8 is less than about 18 m/s, in the reaction zone less than about 15 m/s. In this embodiment of the channels 8, a droplet caching device is installed under the row of nozzles of the spray nozzles 23 but above the spraying plane 12 of the scrubbing tower 1.

The previously mentioned flue gas velocities are sufficient for good scrubbing and produce little loss in flow, so that the suction blower can be laid out economically. The constriction of the flow channel produces improved droplet atomization of the scrubbing solution and at the same time guides the droplets into a nearly vertical flying path so that the proportion of wall water is kept low in the downstream reaction zone. The path after the channel 8 and up to entry into the first demister 3 serves as a reaction zone in which the acidic gas components are bonded to the absorption solution and are formed from carbonate sulfite, sulfite or chloride. The $CO_2$ yielded by the absorption solution is removed together with the flue gas stream.

The first downstream demister 3 consists of several nearly parallel or concentric channels 28 in which the flue gas is turned around from the upward flow by about 180° in the direction of gravitational force, whereby the separated droplets are collected in pockets 24 at the ends of the guiding plates 10,10' and are returned to a feedback (not shown). It is essential for the droplet separation in this case, that the relationship between the distance of the guiding plates 10,10' in the deflection bend and the radius of the bend of the flow channel be less than 0.5, in particular 0.3.

The gas flow 17 is accelerated through the constriction of the channels 8 so that the liquid flowing from the spray nozzles 23 has as little contact as possible with the downstream wall 25 so that the formation of wall water remains minimal. Depending on the design of the channel, the flue gas velocity in the channel 8 is less than 18 m/s or less than 23 m/s. This design makes it possible to omit the wall 25 without having a fusion to an great extent of the droplets of adjoining spray nozzles when several spray nozzles 23 are connected in parallel and the reaction zone is fed under the best conditions.

According to FIG. 2, the spray nozzles 23 are mounted in such manner that the scrubbing solution impacts already before the channels 8 or at their beginning, causing the scrubbing solution to be broken down into droplets already before or at the beginning of the acceleration section. The nozzle pre-pressure should be between about 0.5 bar and about 1.5 bar for this, and the nozzle stream should have a spraying angle of less than 90°.

In the partial load section, when the flue gas velocity in the reaction zone is less than 10 m/s, more wall water forms and the wall water film runs down. In order to prevent a return into the acceleration section, the channels 8 in FIG. 2 are designed in form of pocket-shaped gutters from which the accumulated liquid is removed. The tear edge 9 on the channels 8 are designed to disperse the wall water film formed in the acceleration section into droplets. Thereby, the forming of large drops is prevented, and no liquid flows down from the channel 8. Thus, no catching cup need be installed under the scrubber 2 to catch the drops.

To ensure that the wall film in the demister 3 does not become too thick, in particular when operating with partial load, the first stage of the demister 3 is provided with guiding plates 10,10', and the ratio of the distance between the guiding plates 10 10' of the channel in the deflection bender and the radius of the bend of the flow channel is less than 0.5, and the outer guiding plate 10' is made in form of a V-shaped groove 29 in the center, with an opening angle >90°, so that the guiding plates 10,10' in the area of the reaction zone form an angle a with the horizontal that is no greater than 45°.

The loss in water in the entire scrubber is limited to losses through evaporation and expulsion of the $CaCl_2$, so that the water consumption is low. These evaporation losses are replaced by bilateral spraying and washing of the second demister. Scrubbing prevents crusting. The dripping water, together with the separated droplets goes into the feedback which is not shown here and thereby again into the suspension container 5.

A slurry is formed in the settling basin 13 of the scrubbing tower 1, representing essentially the absorption, which means gypsum when lime stone is used, and this gypsum is conveyed via a discharge 14 to a dewatering apparatus 15, whereby the major portion of the separated $CaCl_2$-containing water is returned via channel 20 into the settling basin 13. The settling basin 13 is supplied with oxygen-containing gas through an oxidation step 6.

The gypsum itself can be used again in the construction material industry, depending on its purity, or can be dumped without difficulty. However, if magnesium carbonate containing lime stone, such as dolomite, is used instead of lime stone, magnesium sulfate is produced in additional gypsum, as a valuable by-product which can be converted into gypsum which is then expelled by the addition of milk of lime 16 in a downstream precipitation 22, whereby the dissolved magnesium hydroxide which is produced is returned into the scrubber with the circulating water and with possibly added heavy metal catalysts or is discharged to be sold. Part of the separated liquid leaves the precipitation 22 in form of $CaCl_2$-containing waste water. Within the framework of the invention, ammonium sulphate can also be fed into the scrubber, thus improving the scrubbing in the scrubber, and the ammonium which is produced thereby is separated from the scrubbing solution flowing off after adding milk of lime 16 in the precipitation 22, followed by stripping, and is finally again fed to the scrubber.

What is claimed is:

1. Process for wet scrubbing of acidic gases from flue gases by means of alkaline or earth-alkaline absorbents, lime stone and/or dolomite, comprising the steps of:

scrubbing the flue gas in a first stage by spraying liquid droplets into a spray tower and directing the flue gas to flow in a direction opposite to the flow of the liquid droplets in the spray tower, scrubbing the flue gas in a second stage situated after the first stage in a flow direction of the flue gas by spraying liquid droplets, through a plurality of nozzles, into a channel arranged in the spray tower and directing the flue gas to flow in the same direction as the flow of the liquid droplets being sprayed into the channel, arranging a first demister after the channel in the flue gas flow direction such that a reaction zone is defined within the channel between an inlet of the channel and the first demister, directing the droplets in the first demister to turn 180° in substantially parallel and concentric channels, directing the droplets from the first demister to a second demister, collecting the droplets after interacting with the flue gas in an oxidation tank, oxidizing sulfite in the suspension in the oxidation tank by directing at least one of air and flue gas into the oxidation tank, and maintaining a level of suspension in the oxidation tank which is substantially equal to a level at which the spray nozzles are situated.

2. The process of claim 1, wherein the channel has an acceleration section arranged between the inlet of the channel and the reaction zone, the liquid droplets being sprayed in a vertically upward direction into the channel and the flue gas being directed to flow vertically upward:

wherein the channel is structured and arranged such that the velocity of the flue gas in the acceleration section is less than about 23 m/s, the velocity of the flue gas in the reaction zone is less than about 18 m/s, and a ratio of the velocity of the flue gas in the reaction zone to the velocity of the flue gas in the acceleration section is about 0.7.

3. The process of claim 2, wherein the droplets are sprayed in the second stage before or at the beginning of the acceleration section such that the droplets impact before or at the beginning of the acceleration section, the pre-pressure of the nozzles defined by the channel being between about 0.5 bar and about 1.5 bar and the nozzle stream having a spraying angle of less than about 90° and the wall liquid being dispersed in the acceleration section at the end of the channel.

4. The process of claim 1, wherein the droplets in the second stage comprise a suspension containing lime stone or dolomite dust having a high residual carbon value such that a residual carbon content in the second stage is greater than a residual carbon content in the first stage, the density of the lime stone or dolomite in said suspension being greater than about 50 g/l, said process further comprising the steps of:

increasing the velocity of the flue gas in the first demister as the flue gas is turned around in the channels in the first demister, removing the suspension after interacting with the flue gas from the spray tower, and oxidizing at least part of the sulfite of the removed suspension into sulphate.

5. The process of claim 1, further comprising the steps of:

feeding $(NH_4)_2SO_4$ into the second stage, adding $Ca(OH)_2$ to the droplets after interacting with the flue gas, thereafter removing ammonium from the droplets after interacting with the flue gas to which $Ca(OH)_2$ is added, and recycling the resultant solution to the second stage.

6. The process of claim 1, further comprising the step of:

arranging at least one additional channel alongside the channel in the spray tower such that a plurality of such channels are provided in the spray tower, each of the at least one additional channel being defined by a pair of walls.

7. A process for wet scrubbing of acidic gases from flue gases by means of alkaline or earth-alkaline absorbents, lime stone and/or dolomite, comprising the steps of:

scrubbing the flue gas in a first stage by spraying liquid droplets into a spray tower and directing the flue gas to flow in a direction opposite to the flow of the liquid droplets in the spray tower, scrubbing the flue gas in a second stage situated after the first stage in a flow direction of the flue gas by spraying liquid droplets into a channel arranged in the spray tower and directing the flue gas to flow in the same direction as the flow of the liquid droplets being sprayed into the channel, arranging a first demister after the channel in the flue gas flow direction such that a reaction zone is defined within the channel between an inlet of the channel and the first demister, directing the droplets in the first demister to turn 180° in a first and second pair of substantially parallel and concentric curvilinear channels, directing the droplets from the first demister to a second demister, collecting the droplets after interacting with the flue gas in a settling basin situated at a bottom of the spray tower, and scrubbing at least one of magnesium hydroxide and heavy metal catalysts from the solution in the settling basin.

8. An arrangement for wet scrubbing of acidic gases from flue gases by means of alkaline or earth-alkaline absorbents, lime stone and/or dolomite, comprising a spray tower including a scrubber for receiving flue gas and spraying a scrubbing liquid in first and second stages into contact with the flue gas, the scrubbing liquid being a carbon-containing suspension capable of absorbing acid gas components in the flue gas, said scrubber including channels arranged to accelerate the flue gas in a vertically upward direction by narrowing a path of flow of the flue gas up to about 50%, first spray means for spraying the scrubbing liquid in the first stage in a direction opposite to the direction of flow of the flue gas and second spray means for spraying the scrubbing liquid in the second stage in the same direction as the direction of flow of the flue gas, a first demister arranged after said scrubber in a flow direction of the flue gas, said first demister including parallel and concentric channels arranged to turn the flue gas by about 180°, said second spray means comprising spray nozzles for spraying droplets of the scrubbing liquid from a location below said channels in said scrubber in a direction upward toward said channels in said scrubber while the flue gas flows in the upward direction, and a second demister arranged after said first demister in the flue gas flow direction; and an oxidation tank for receiving the droplets after interacting with the flue gas, a level of suspension in said oxidation tank being substantially equal to a level of said spraying nozzles in said scrubbing tower.

9. The arrangement of claim 8, wherein each of said channels in said scrubber comprise a narrowing channel arranged therein said narrowing channel including a tear edge a wall of said narrowing channel and a wall of said channel in said scrubber defining a pocket therebetween.

10. The arrangement of claim 8, further comprising guide plates for defining said channels in said first demister, an uppermost one of said guide plates having a central groove with an opening angle of greater than about 90° such that said guide plates form an angle a with a horizontal plane in said reaction zone that is less than about 45°.

11. The arrangement of claim 8, wherein the parallel and concentric channels in said first demister include at least one pocket for collecting droplets after interacting with said flue gas.

12. An arrangement for wet scrubbing of acidic gases from flue gases by means of alkaline or earth-alkaline absorbents, lime stone and/or dolomite, comprising a spray tower including a scrubber for receiving flue gas and spraying a scrubbing liquid in first and second stages into contact with the flue gas, the scrubbing liquid being a carbon-containing suspension capable of absorbing acid gas components in the flue gas, said scrubber including channels arranged to accelerate the flue gas in a vertically upward direction by narrowing a path of flow of the flue gas up to about 50%, first spray means for spraying the scrubbing liquid in the first stage in a direction opposite to the direction of flow of the flue gas and second spray means for spraying the scrubbing liquid in the second stage in the same direction as the direction of flow of the flue gas, a first demister arranged after said scrubber in a flow direction of the flue gas, said first demister including parallel and concentric channels arranged to turn the flue gas by about 180°, said second spray means comprising spray nozzles for spraying droplets of the scrubbing liquid from a location below said channels in said scrubber in a direction upward toward said channels in said scrubber while the flue gas flows in the upward direction, and a second demister arranged after said first demister in the flue gas direction; and a settling basin arranged at a bottom of said scrubbing tower for receiving droplets after interacting with the flue gas, an outlet coupled to said settling basin for removing the suspension from said settling basin, and a dewatering device coupled to said outlet for receiving the removed suspension.

13. In a spray tower including means for directing flue gases containing acidic gases, in a flow path, and means for spraying liquid droplets of alkaline or earth-alkaline absorbents, lime stone and/or dolomite into the flow path of the flue gases to react with the acidic gases and thereby scrub the flue gases, the improvement comprising:

a demister arranged at a location after the liquid droplets have been sprayed by said spray means into the flow path of the flue gases, said demister including parallel and concentric channels arranged to turn the flue gases by about 180°, a first set of nozzles arranged to spray liquid droplets in a direction opposite to the direction of flow of the flue gases, a second set of nozzles arranged after said first of nozzles in the flow path of the flue gases and to spray liquid droplets in the same direction as the flow direction of the flue gases at least one channel arranged between said second set of nozzles and said demister and through which the flue gases flow, said nozzles in said second set of nozzles being arranged to spray the droplets from a location below said at least one channel into said at least one channel in an upward direction while the flue gases flow in the upward direction, said at least one channel is formed by a first pair of walls arranged between a second pair of walls, each of said walls in said first pair of walls having an inwardly directed tear edge.

14. The spray tower of claim 13, wherein said at least one channel has a variable cross-section and an acceleration section is defined between an inlet of said at least one channel and a narrowest cross-section of said at least one channel.

15. The spray tower of claim 13, wherein said at least one channel narrows from an inlet to a throat such that the flue gases are accelerated when passing through said at least one channel.

16. In a spray tower including means for directing flue gases containing acidic gases, in a flow path, and means for spraying liquid droplets of alkaline or earth-alkaline absorbents, lime stone and/or dolomite into the flow path of the flue gases to react with the acidic gases and thereby scrub the flue gases, the improvement comprising:

a demister arranged at a location after the liquid droplets have been sprayed by said spray means into the flow path of the flue gases, said demister including a first and second pair of parallel and concentric curvilinear channels arranged to turn the flue gases by about 180°; and guide plates for defining said channels in said demister, an uppermost one of said guide plates having a central groove with an opening angle of greater than about 90° such that said guide plates form an angle $\alpha$ with a horizontal plane of less than about 45°.

* * * * *

UNITED STATES PATENT AND TRADEMARK OFFICE

CERTIFICATE OF CORRECTION

PATENT NO. : 6,235,256 B1
DATED : May 22, 2001
INVENTOR(S) : Lang et al.

It is certified that error appears in the above-identified patent and that said Letters Patent is hereby corrected as shown below:

Title page, Item [54] and Column 1, line 4,
Should read -- PROCESS AND DEVICE FOR THE SCRUBBING OF ACIDIC GASES --.

Signed and Sealed this

Fifth Day of March, 2002

*Attest:*

JAMES E. ROGAN

*Attesting Officer*

*Director of the United States Patent and Trademark Office*